US012737382B2

(12) United States Patent
Mátray et al.

(10) Patent No.: US 12,737,382 B2
(45) Date of Patent: Sep. 15, 2026

(54) GRANULAR REPLICA HEALING FOR DISTRIBUTED DATABASES

(71) Applicant: Telefonaktiebolaget LM Ericsson (publ), Stockholm (SE)

(72) Inventors: Péter Mátray, Budapest (HU); Dániel Géhberger, Montreal (CA); Gábor Németh, Budapest (HU)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 99 days.

(21) Appl. No.: 18/266,194

(22) PCT Filed: Dec. 19, 2020

(86) PCT No.: PCT/IB2020/062251

§ 371 (c)(1),
(2) Date: Jun. 8, 2023

(87) PCT Pub. No.: WO2022/130005

PCT Pub. Date: Jun. 23, 2022

(65) Prior Publication Data

US 2024/0028611 A1 Jan. 25, 2024

(51) Int. Cl.
*G06F 16/27* (2019.01)
*G06F 11/16* (2006.01)

(52) U.S. Cl.
CPC .......... *G06F 16/27* (2019.01); *G06F 11/1662* (2013.01); *G06F 2201/80* (2013.01)

(58) Field of Classification Search
CPC ... G06F 16/27; G06F 11/1662; G06F 2201/80
See application file for complete search history.

(56) References Cited

U.S. PATENT DOCUMENTS 9,971,823 B2 5/2018 Vasanth et al.
11,314,717 B1 * 4/2022 Certain ............... G06F 16/2308
(Continued)

FOREIGN PATENT DOCUMENTS

WO 2021098962 A1 5/2021
WO 2021104649 A1 6/2021

OTHER PUBLICATIONS

Ongaro, D. et al., "Fast Crash Recovery in RAMCloud", SOSP'11: Proceedings of the Twenty-Third ACM Symposium on Operating Systems Principles, Oct. 23, 2011, pp. 29-41, ACM.
(Continued)

*Primary Examiner* — Courtney Harmon
(74) *Attorney, Agent, or Firm* — COATS & BENNETT, PLLC

(57) ABSTRACT

A healing procedure is disclosed for distributed database. A storage node locally stores metadata for a plurality of data items stored in the distributed database. The metadata includes, for each data item, an identifier associated with the data item and an associated replica location list indicating one or more storage nodes in the distributed database storing replicas of the data item. Responsive to a trigger indicating a fault in a second storage node, the storage node iterates over the metadata to identify compromised data items for which the first storage node is designated as a healing node and performs a healing procedure for each compromised data item where the first storage node is designated as the healing node.

23 Claims, 9 Drawing Sheets

(56) References Cited

U.S. PATENT DOCUMENTS

| | | | | |
|---|---|---|---|---|
| 2018/0314706 | A1* | 11/2018 | Sirton | H04L 67/1097 |
| 2019/0392047 | A1* | 12/2019 | Sorenson, III | G06F 16/172 |
| 2020/0250042 | A1* | 8/2020 | Sharma | G06F 11/1448 |
| 2020/0322425 | A1 | 10/2020 | Sharma et al. | |
| 2021/0089540 | A1* | 3/2021 | Karl | G06F 16/24552 |
| 2021/0279151 | A1* | 9/2021 | Sarkar | G06F 11/1469 |

OTHER PUBLICATIONS

Shen, K. et al., "Clustering Support and Replication Management for Scalable Network Services", IEEE Transactions On Parallel and Distributed Systems, vol. 14 No. 11, Nov. 2003, pp. 1168-1179, IEEE.

Ongaro, D. et al., "In Search of an Understandable Consensus Algorithm", Proceedings of USENIX ATC '14: 2014 USENIX Annual Technical Conference, Jun. 19-20, 2014, Philadelphia, PA, pp. 304-319, USENIX.

Németh, G. et al., "DAL: Locality-Optimizing Distributed Shared Memory System", 9th USENIX Workshop on Hot Topics in Cloud Computing, Jul. 2017, pp. 1-6, USENIX.

Lamport, L., "Paxos Made Simple", Nov. 1, 2001, pp. 1-14, retrieved from https://lamport.azurewebsites.net/pubs/paxos-simple.pdf.

* cited by examiner

N1
SLAVE
REPLICA 1

N2

N3
MASTER
COPY

N4
SLAVE
REPLICA 2

DATA ITEM METADATA

| N3 | N1 | N4 |
| --- | --- | --- |

FIG. 5B

GRANULAR REPLICA HEALING FOR DISTRIBUTED DATABASES

TECHNICAL FIELD

The present disclosure relates generally to distributed databases and, more particularly, to automated replica healing for distributed databases.

BACKGROUND

In Fifth Generation (5G) networks, most telecommunication applications are being transformed to become cloud-native. Traditionally monolithic components are being re-architected into smaller, independent and reusable functional components called microservices, while also being redesigned to become hardware and cloud runtime independent, i.e., cloud agnostic. As a result, cloud-based telecom systems are expected to deliver vastly improved flexibility and manageability without compromising the high level of reliability their native counterparts provide. In this new paradigm, applications (or network functions) will become independently scalable and gradually upgradable, while also enduring the failure/termination/relocation of individual application instances without impacting end user experience.

One of the key enablers for achieving these goals is to separate the important application states from the life cycle of the application. Separation of the application states is achieved by introducing an extra service in the system: a database. Applications can push their state changes (e.g., the metadata on the handled end-user sessions) to the external database and, once the application is scaled, relocated, restarted or failed over, it can read back those states and resume its tasks. This design pattern is often referred to as state externalization.

As a result of state externalization, individual application instances and hardware elements, such as physical servers or switches, are disposable and exchangeable. The cornerstone of the system's reliability is the database. The externalized states need to be kept available so that applications can access them as needed. To achieve high availability, the database is distributed among multiple nodes to achieve resilience, and the stored data items are replicated to multiple s to avoid data loss upon the failure of a database instance.

To achieve reliability, the storage nodes of the database form a cluster and replicate the stored data to multiple servers within the cluster. One of the most common replication schemes is master-slave replication. For each stored data item there exists a master copy, and all updates to the master are replicated to one or more slave replicas. To better defend against hardware failures, replication is commonly done in an anti-affine manner: slave replicas are almost always stored in a different location (host, rack, or data center) than the master copy and the rest of the slave replicas.

When a storage node R fails, the replicas stored on R become unavailable. Even though the remaining nodes can continue to service client requests, there are several downsides arising from this degraded state of the database cluster including partial unavailability of data, increased risk of data loss, performance degradations and increase risk of cascading failure. To minimize the impact of these problems, it is important to perform the failure recovery of R as quickly as possible. A prominent method for recovery is to recreate the lost replicas elsewhere in the cluster, and if needed, designate one of the replicas as the new master. This method of recovery is called replica healing, or healing for short.

Two well-known cloud providers, RAMCloud and Amazon, employ replica healing in large scale distributed databases. RAMCloud is a hybrid storage system, which stores master data items in Dynamic Random Access Memory (DRAM) on designated Master nodes, and slave replicas in slower persistent storage on Backup nodes. The advantage of this design is that it combines extreme scalability with very fast client reads/write operations. All requests are served by the master node (i.e., from DRAM), and they employ a 25 Gbps InfiniBand network to achieve 5-15 microseconds access latency.

When a RAMCloud Master node fails, a central Coordinator node collects metadata from all Backup nodes to find out who has the backup segments for the lost Master node. This broadcast is necessary because the master-backup mapping is stored only on the failed Master node. Once the Coordinator rebuilds the backup locations, it divides the healing job into smaller partitions and assigns a Recovery Master selected from the existing master nodes for each partition. The recovery masters replay the relevant logs from the backup nodes. By the end of this procedure, the Recovery Masters become the new masters for all the data that was previously stored on the failed Master node.

By employing 100s (or even 1000s) of nodes, RAMCloud is able to harnesses the combined capacity of individual servers to quickly reconstruct lost data. If the log replay is done from a sufficiently large number of Backups (to avoid disk I/O limitations on Backups) to a sufficiently large number of Recovery Masters (to avoid network and CPU limitations on the Recovery Master), then RAMCloud can heal from a Master failure within 1-2 seconds U.S. Pat. No. 9,971,823 to Amazon describes a generic method for failure detection and replica healing. Their system is composed of multiple Storage Nodes (storing the data replicas) and an Admin Instance that is responsible for recovery control. The Admin Instance periodically scans through the metadata to check the health of the replica groups. If a replica group is found to be in unhealthy state (i.e., a replica is missing), then the Admin Instance schedules a replica recovery mechanism for it and a new replica is created from one of the still available replicas.

The current methods of replica healing are useful but were not designed with cloud-native applications in mind. Consequently, some problems remain implementing known healing procedures in cloud native applications.

In the RAM Cloud system, recovered data becomes unavailable both for reading and writing during healing, which may not be tolerable for telecommunications and some other applications. As one example, Virtual Border Gateway Function (vBGF) needs to access externalized sessions states immediately in order to recover the impacted sessions. As another example, a typical robot control application works with ~10 milliseconds control loop and may need to access externalized states in each loop.

Also, the RAM Cloud system was designed for large scale web applications and is not a good fit for small and mid-scale systems. To achieve fast recovery times, the system requires a large number of machines/disks (100s-10.000s) to sufficiently spread the recovery workload. Many real-world distributed systems run on only a handful of machines. The largest cluster size for vBGF in live deployments is typically below 20.

In the RAMCloud system, backups are always kept on disk, which means can be costly. This cost may not be necessary for ephemeral data, such as application states are ephemeral (i.e. won't be required later if there's a large-scale failure happening, e.g. the power goes out in the entire data center). Again, typical telecom session states can be considered ephemeral or for ephemeral data (e.g., session states). Current solutions sometimes copy data unnecessarily. Finally, some of the current solutions require a centralized controller that adds non-negligible overhead, creates a single point of failure and are more difficult to scale.

The RAMCloud system also copies some data unnecessarily during recovery. When a Recovery Master replays the failed Master's data, it immediately re-replicates it to 3 new Backup nodes. However, the same data is already stored on 3 Backups nodes (to where it was replicated by the failed Master, before its failure). During healing, RAMCloud creates 4 new copies of each recovered data item (1 master+3 backups), and finally deletes the 3 old replicas.

In the RAMCloud system, a portion of healing control is still centralized on the single instance Coordinator that collects the backup segment locations, partitions the healing job and instructs Recovery Masters to start recovery for their assigned partitions. This may add non-negligible overhead if: a) there are many items to be recovered, or b) there's a Coordinator failure during recovery, and the healing has to be restarted. Note that the Coordinator externalizes its own states, i.e., RAMCloud metadata into a ZooKeeper cluster, so a Coordinator failure/restart will not affect the data in the RAMCloud cluster.

In the Amazon solution, procedure, there is a single centralized Admin Instance coordinating the healing procedure and creating a single point of failure in the system. If the Admin Instance fails, the entire recovery mechanism is jeopardized. No new healing jobs can be triggered and the ongoing healing jobs are halted.

The Amazon solution is also not easily scalable and lacks granularity. The single Admin Instance may work well if only a small number of (possibly large) data items need to be recovered (e.g., database tables, or table partitions. However, the solution would not work well if recovery was to be performed on a large number of (possibly small) data items (e.g., key-values). In such a granular healing scenario, the Amazon solution would suffer from excessive overhead, severely slow down the process of recovery and unnecessarily prolong the degraded state of the database cluster.

Accordingly, there remains a need for an automated replica healing solution in distributed databases that avoids these drawbacks.

SUMMARY

The present disclosure relates to automated replica healing in distributed databases. The distributed database employs a granular replication scheme wherein each data item (e.g., key-value pair) has a master copy and one or more slave replicas (with anti-affinity). The locations of the master copy and slave replicas are decided independently for each key or data item. The metadata indicating replica locations for the data item is replicated to every storage node. In the event that a storage node fails, a replica healing procedure is triggered to recover the impacted items. This healing procedure is distributed. Based on the metadata, each storage node autonomously determines which data items it is responsible for healing and can proceed with the healing of those data items independently of the other storage nodes. This design avoids creating a single point of failure for healing, and substantially speeds up the healing process by effectively distributing and parallelizing the recovery work. In addition to these advantages, the data items are always available for reading and writing, even while they are in an unhealthy state and their recovery is underway.

A first aspect of the disclosure comprises a method implemented by a first storage node in a distributed database of healing compromised data items stored in the distributed database. The method comprises locally storing metadata for a plurality of data items stored in the distributed database. The metadata includes, for each data item, an identifier associated with the data item and an associated replica location list indicating one or more storage nodes in the distributed database storing replicas of the data item. The method further comprises, responsive to a trigger indicating a fault in a second storage node, iterating over the metadata to identify compromised data items for which the first storage node is designated as a healing node. The method further comprises performing a healing procedure for each compromised data item where the first storage node is designated as the healing node.

A second aspect of the disclosure comprises a first storage node in a distributed database configured to perform a healing procedure to heal compromised data items stored in the distributed database. The data storage node is configured to locally store metadata for a plurality of data items stored in the distributed database. The metadata includes, for each data item, an identifier associated with the data item and an associated replica location list indicating one or more storage nodes in the distributed database storing replicas of the data item. The data storage node is configured to, responsive to a trigger indicating a fault in a second storage node, iterate over the metadata to identify compromised data items for which the first storage node is designated as a healing node. The data storage node is configured to perform a healing procedure for each compromised data item where the first storage node is designated as the healing node.

A third aspect of the disclosure comprises a first storage node in a distributed database configured to perform a healing procedure to heal compromised data items stored in the distributed database. The data storage node comprises communication circuitry configured for communication with client devices and with other storage nodes in the distributed database, data storage for storing replicas of data items and processing circuitry. The processing circuitry is configured to locally store metadata for a plurality of data items stored in the distributed database. The metadata includes, for each data item, an identifier associated with the data item and an associated replica location list indicating one or more storage nodes in the distributed database storing replicas of the data item. The processing circuitry is configured to, responsive to a trigger indicating a fault in a second storage node, iterate over the metadata to identify compromised data items for which the first storage node is designated as a healing node. The processing circuitry is configured to perform a healing procedure for each compromised data item where the first storage node is designated as the healing node.

A fourth aspect of the disclosure comprises a computer program comprising executable instructions that, when executed by processing circuitry in a storage node in a distributed database causes the storage node to perform the method according to the first aspect.

A fifth aspect of the disclosure comprises a carrier containing a computer program according to the fourth aspect, wherein the carrier is one of an electronic signal, optical signal, radio signal, or computer readable storage medium.

BRIEF DESCRIPTION OF THE DRAWINGS

FIG. 5A schematically illustrates how replicas of a data item are stored by a cluster of data storage nodes in a distributed data base.

FIG. 5B illustrates metadata for the data item illustrated in FIG. 3A.

DETAILED DESCRIPTION

Figure 1:
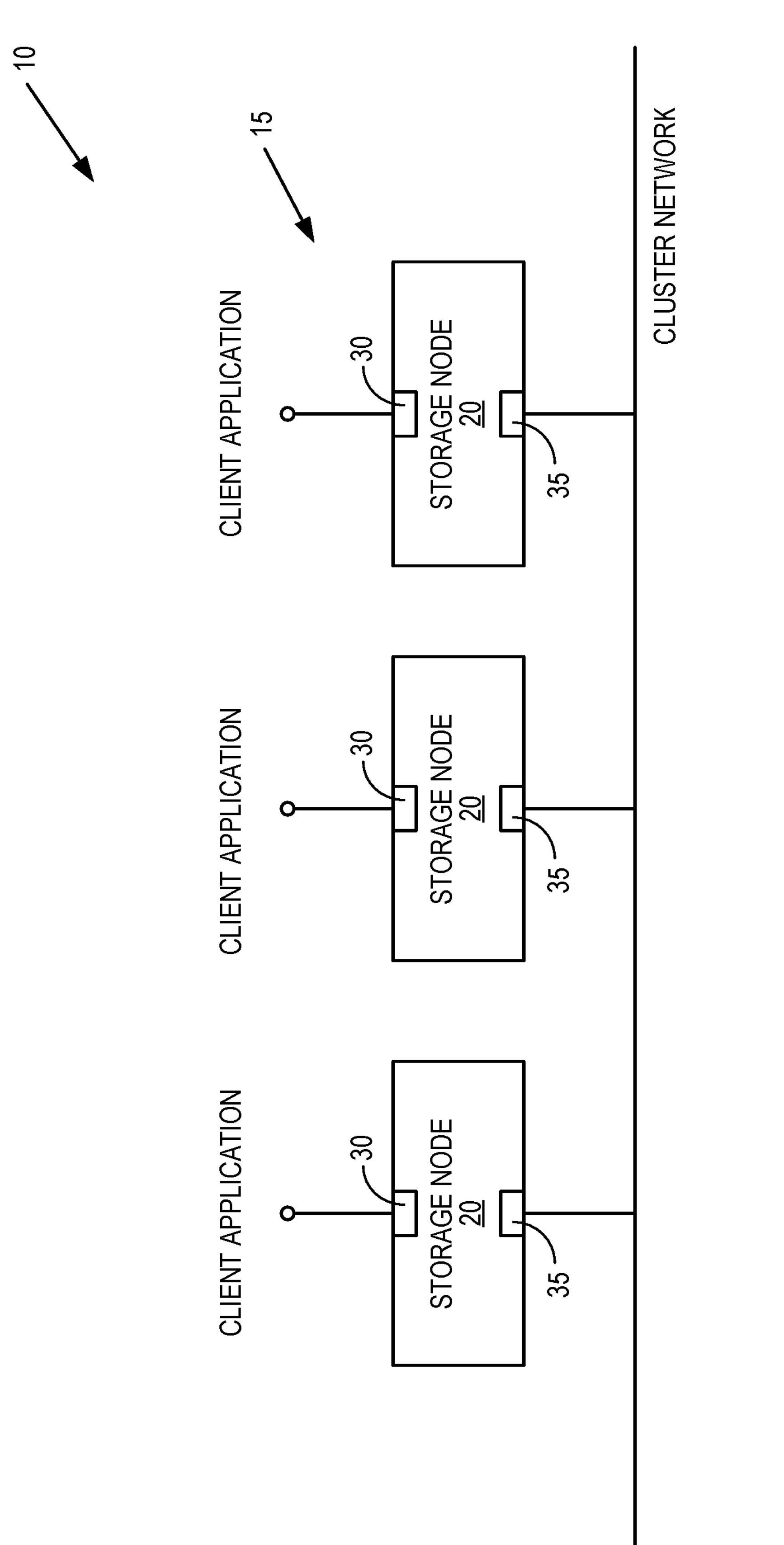
FIG. 1 illustrates a cluster of data storage nodes in a distributed database.

Referring now to the drawings, FIG. 1 schematically illustrates a data storage network 10 including a plurality of data storage nodes 20 organized into clusters 15. Each storage node 20 has two interfaces: a cluster interface 25 for communicating with other storage nodes 20 (e.g., for replicating data) and a client interface 30 for communicating with client applications (i.e., clients issue read and write requests via this interface). The storage nodes 20 implement a master-slave replication scheme at the granularity of a data item where individual data items are replicated on multiple storage nodes in an anti-affine manner, i.e., the slave replicas are at different locations than the master copy and other slave replicas. The locations of the master copy and slave replicas are determined independently for each data item.

As used herein, the term "replica" refers to an instance of a data item and includes both the master copy and slave replicas. The term "replicas is synonymous with the term "copy." Thus, the master copy may also be referred to as a master replica and the slave replicas may also be referred to as a slave copies. In this disclosure, the terms master copy and slave replica are used solely to highlight the difference between master and slave replicas.

When a storage node 20 fails, the replicas stored on the failed storage node 20 become unavailable. Even though the remaining storage nodes 20 can continue to service client requests, there are several downsides arising from this degraded state of the cluster 15 including partial unavailability of data, increased risk of data loss, performance degradations and increased risk of cascading failure.

One area of concern is data availability during healing. When a data storage node fails, some of the replicas, including some master copies, become unavailable for reading and writing. In some prior art systems, the data items typically become either read-only (as there's no master available for writing), or completely unavailable (in case the system serves read operations solely from the master copies) until the cluster 15 is recovered to a healthy state. This window of unavailability may not be tolerable for some telecom and third-party applications. For example, during a failover, a Virtual Border Gateway Function (vBGF) standby will need to access externalized sessions states immediately, in order to recover the impacted sessions. As another example, a typical robot control application works with ~10 milliseconds control loop and may very well need to access externalized states in each loop.

Another concern is increased risk of data loss while the data items stored by the failed storage node are being recovered. If one of the replicas for a data item is lost, the data item is in a vulnerable state. If other storage nodes 20 fail before the data item is healed, there is an increased risk of all replicas being lost.

In cases where a data item is impacted by failure of a storage node 20 but is still available (e.g., for reads) from other storage nodes 20, then clients must access the data item from those other storage nodes 20 until the cluster recovery is complete. Due to the anti-affinity aspect of replication, clients may have to switch to reads from a farther replica, leading to increased read response times for the data item.

There is also a risk of cascading failures. When the distributed database is integrated with an active-standby application (e.g., a telecom application like Virtual Internet Protocol (IP) Multimedia Subsystem (vIMS) and vBGF), then a node failure may trigger the failover of all its active workload (e.g., ongoing media sessions) to a single other host (e.g., a standby node). In such a case, there is an elevated risk of creating a hot spot/overload in the system, potentially generating an avalanche of failure events.

One aspect of the disclosure comprises automated replica healing in distributed databases to avoid or minimize the impact of these problems. The distributed database employs a granular replication scheme wherein each data item (e.g., key-value pair) has a master copy and one or more slave replicas (with anti-affinity). The locations of the master copy and slave replicas are decided independently for each key or data item. The metadata indicating replica locations for the data item is replicated to every storage node 20. In the event that a storage node 20 fails, a replica healing procedure is triggered to recover the impacted items. This healing procedure is distributed. Based on the metadata, each storage node 20 autonomously determines which data items it is responsible for healing and can proceed with the healing of those data items independently of the other storage nodes 20. This design avoids creating a single point of failure for healing, and substantially speeds up the healing process by effectively distributing and parallelizing the recovery work. In addition to these advantages, the data items are always available for reading and writing, even while they are in an unhealthy state and their recovery is underway.

Figure 2:
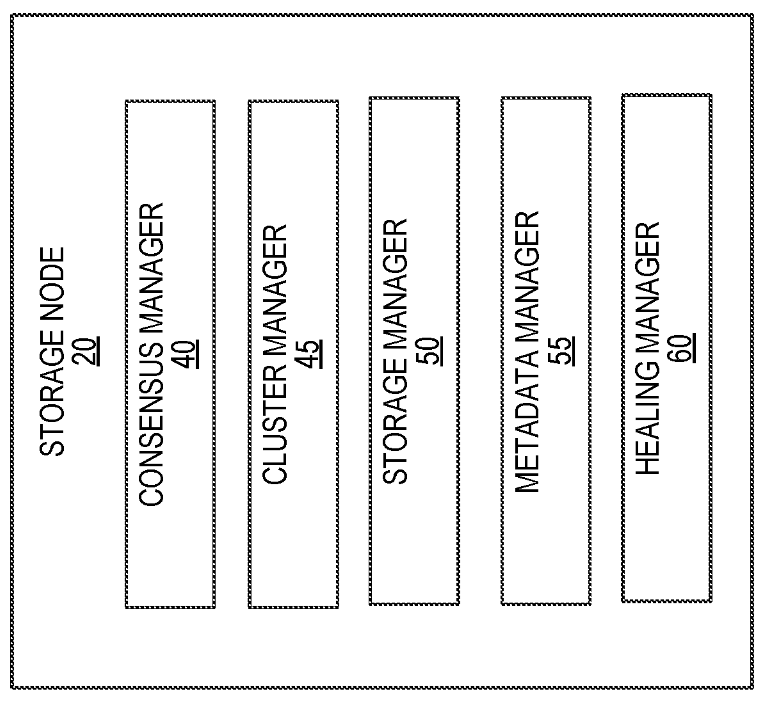
FIG. 2 illustrates an exemplary storage node for a distributed database.

FIG. 2 illustrates the main functional components of the storage node 20 in one exemplary embodiment. The storage node 20 comprises a consensus manager 40, cluster manager 45, storage manager 50, metadata manager 55, and healing manager 60.

Each storage node 20 incorporates a consensus manager 40. The consensus manager instances communicate with each other, and together they implement a distributed consensus service. The role of this service is to ensure cluster-wide agreement on events, including the ordering of those events. One common way to implement consensus is to provide an abstraction of a consistent, replicated log. The log is a series of entries, each describing a simple atomic change to the system's state (e.g. that a new storage node 20 has joined the cluster, or that a new data item has been created).

Figure 3:
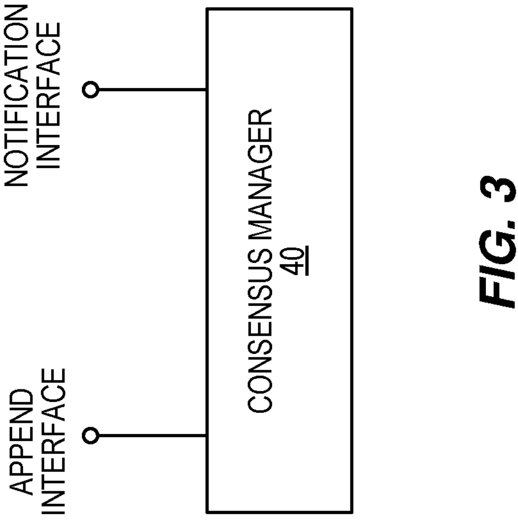
FIG. 3 illustrates a consensus manager for a data storage node.

Each consensus manager instance maintains a replica of the log, and provides two main interfaces to its clients as shown in FIG. 3. The first interface is an append interface by which its clients can append new entries (messages) to the replicated log. The second interface is a notification interface by which the consensus manager 40 notifies its clients about each and every newly appended replicated log entry (or message).

The consensus service is an internal service of the system, meaning that its clients are other system components (e.g., the cluster manager 45), and not end-user applications. One example of a consensus service that can be used to implement a replicated log and consensus service is described in L. Lamport "Paxos made simple." ACM Sigact News 32.4 (2001): 18-25.

Each storage node 20 incorporates a cluster manager 45. The role of the cluster manager 45 is to administer cluster membership and peer health status, and to trigger a replica healing procedure when appropriate. To facilitate these tasks, the cluster manager 45 keeps a list of peer storage nodes 20 in the cluster 15, and registers node status information for each peer in the list. When a storage node 20 joins the cluster 15 (by connecting to one of the existing storage nodes 20), the respective cluster manager 45 uses the consensus service to create a cluster-wide agreement on adding the new storage node 20 to the cluster 15. Once agreement is reached, the cluster manager 45 at each storage node 20 in the cluster 15 adds the new storage node 20 to its peer list and sets its status to ACTIVE.

The cluster manager 45 also monitors the health of other cluster members, and in case a storage node 20, denoted R, becomes unreachable, it updates R's status to MISSING. If the system is configured to automatically remove MISSING nodes, the cluster manager 45 also requests the consensus manager 40 to replicate a 'REMOVE R' message. Once each cluster manager instance receives this message, they independently change R's status to HEALING, and immediately trigger a healing procedure to recover data items associated with R. The advantage of this automation is that it minimizes the time between failure of a storage node 20 and start of the healing.

If the system is not configured to automatically remove MISSING nodes, the cluster manager 45 waits for one of two possible events. First, the MISSING node may reconnect after a while (e.g., in case of a temporary networking or scheduling issue). In this case, the cluster manager 45 changes its status back to ACTIVE. Second, the cluster administrator (a human or a computer program overseeing the system) may issue an explicit REMOVE command to remove the missing node R. In this case, the cluster manager 45 calls into the consensus manager 40 to replicate a 'REMOVE R' message. As before, once the cluster manager instances receive this message, they independently change R's status to HEALING in their peer list, and immediately trigger a healing procedure to recover the data items associated with R. The advantage of the non-automatic node removal is the improved safety. This option relies on external information on the missing node's status, and hence can help minimize the chance of removing a healthy, but temporarily disconnected peer.

To enable the manual/programmatic removal of storage nodes 20, the cluster manager 45 provides a special remove interface. The database administrator may issue a node removal command via this interface, even if the to-be-removed peer is in the ACTIVE state. In this case, the cluster manager 45 proceeds as before by replicating a 'REMOVE R' message via the consensus service, changing the node's status to HEALING and triggering a healing procedure.

Figure 4:
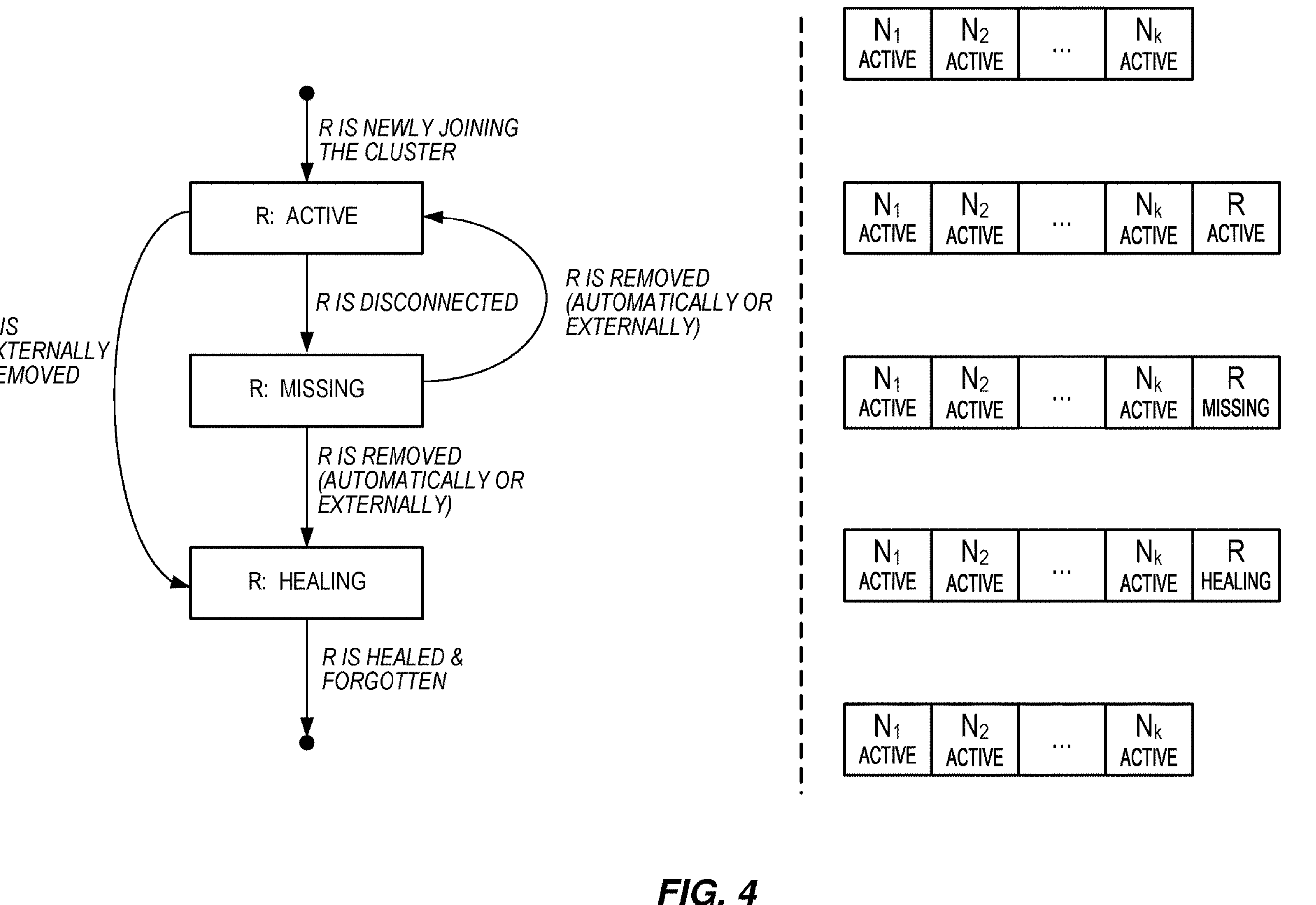
FIG. 4 is a state diagram illustrating various states of a storage node.

FIG. 4 illustrates the state transitions for a storage node 20 along with a peer list maintained by a cluster manager 45 showing the status of the storage nodes 20 in a cluster 15. As shown in FIG. 4, a storage node 20 has three possible states: ACTIVE, MISSING and HEALING. Initially, the peer list includes nodes N1-Nn. When a storage node 20 joins a cluster 15, it is added to the peer list and its status is set to ACTIVE. When the storage node 20 disconnects, the peer list is updated to change its status to MISSING. If the storage node 20 subsequently reconnects, the peer list is updated to change its status back to ACTIVE. If a storage node 20 is externally removed, the peer list is updated to changes its status to HEALING. Once the healing procedure is completed to recover the lost data items as hereinafter described, the storage node 20 is removed from the peer list and forgotten.

Each storage node 20 incorporates a storage manager 50, which is responsible for storing the client applications' data items. Depending on the data model, the data item can be a key-value pair, a database table, a table partition, etc. In general, the data model is specified by the implementation. The storage manager 50 stores all application data in volatile memory, such as Dynamic Random-Access Memory (DRAM), by default. In some embodiments, the storage manager 50 stores all application data in persistent media, such as a Solid State Drive (SSD). The choice between the two mainly depends on the access latency and data durability requirements of the application.

Each storage node 20 incorporates a metadata manager 55. The role of the metadata manager 55 is to administer data items stored in the system. To facilitate this task, the metadata manager 55 keeps a list of metadata for the data items: the metadata contains a data item ID (e.g., the key, or a hash value) and a list of replica locations for the item.

When a client a creates a new data item, the metadata manager 55 assigns one master node, and zero or more slave nodes to store a replica of the data item depending on the replication factor requested by the client. The arising list of replica locations is registered in the data item's metadata. The metadata also specifies which replica is the master copy and defines an ordering among the slave replicas. In one embodiment, this information is encoded in a single replica location list. The first entry of the location list denotes the master copy and each subsequent entry designates a slave replica. Each list entry contains the address of the storage node hosting the corresponding replica of the data item.

Figures 5A, 5B:
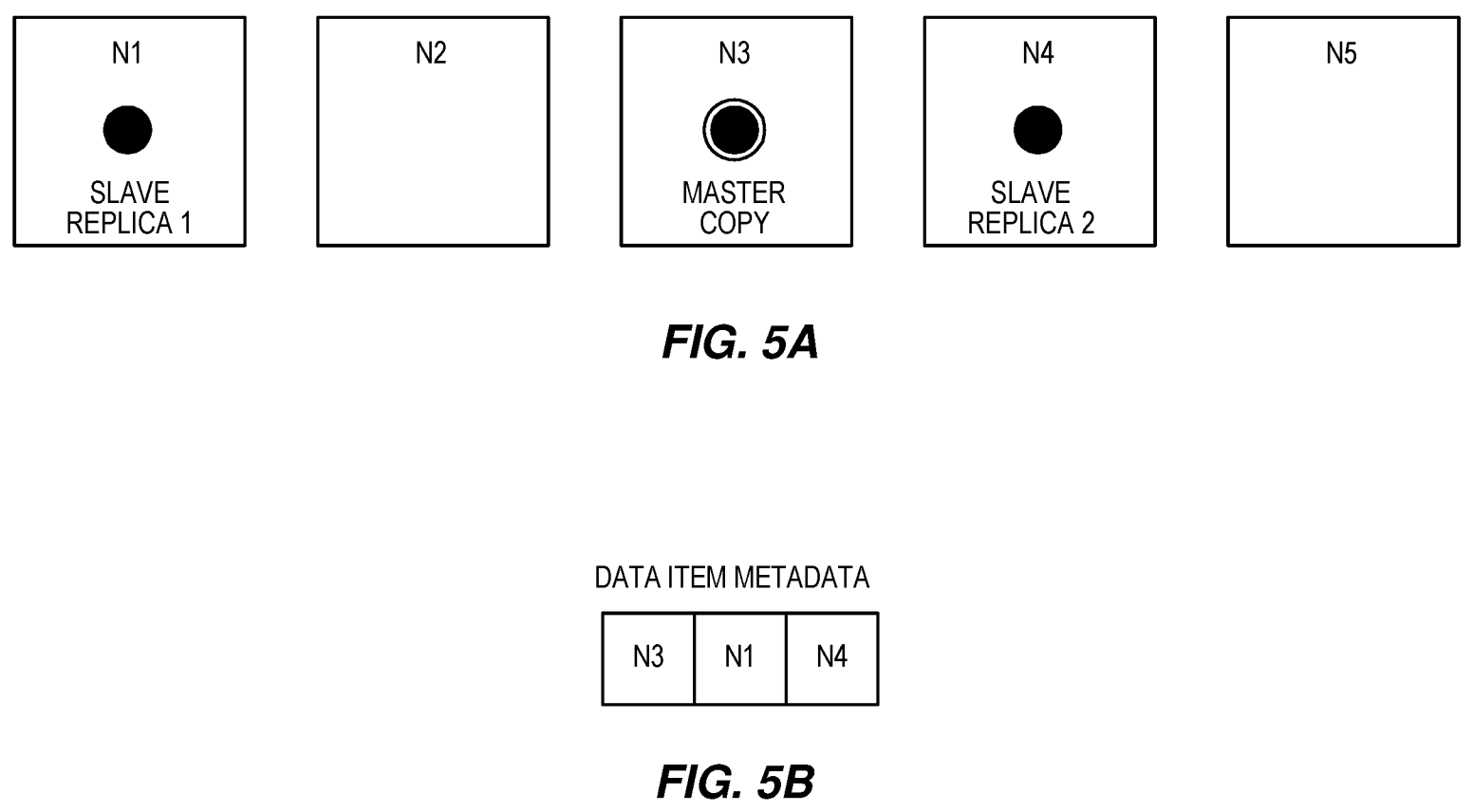

FIG. 5A depicts an exemplary allocation for a data item with 2 slave replicas. In this example, the master copy of the data item is stored by N3 and two slave replicas are stored by N1 and N4 respectively. FIG. 5B illustrates the metadata for the data item as an ordered list of storage nodes 20 storing replicas of the data item. The first entry in the list represents the master copy and the following entries represent slave replicas.

There are multiple ways the metadata manager 55 may assign the replica locations. Some examples include: a) randomly, b) according to a layout specified by the client, or c) based on the resource capacity/utilization of the storage nodes 20. Replica locations are always assigned in a manner so that each storage node 20 may host at most one replica of a given data item. In some embodiments, the system may employ more sophisticated anti-affinity rules, e.g. each server rack may host at most one replica of a data item.

Once the new item's metadata is complete, the metadata manager 55 relies on the consensus service to replicate it within the cluster 15. As a result, all metadata managers 55 are notified about the item and its metadata, and in turn register the new metadata in their local metadata list.

Preferably, replica placement is performed independently for each data item. The system does not distinguish between master nodes and slave nodes. Instead, all storage nodes 20 store a mixture of master and slave replicas for various data items.

When a client wishes to read or write a data item, it first issues a location query to a convenient (e.g., the closest) storage node 20 using the data item ID. The storage node 20 then replies with the metadata for the data item. The client caches the metadata (to avoid subsequent location queries for the same item), picks an item from the replica location list and turns to a respective storage server for reading/writing the data. For read or write requests, if the data ID does not exist an error may be issued. The handling of the error can be implementation dependent. For write requests, where this can result in a creation of a data item as described herein, or the error can be given to the party who initiated the write request. For a read request, only the latter option is available.

For read operations, clients may freely choose a replica location (from the metadata). For write operations, clients must access to the master copy as defined by the replica ordering scheme, e.g., the first entry in the location list, in order to keep the data item replicas in a consistent state. When a master node for a data item receives a write request, it replicates the data item update to all the slave replicas (i.e., all the other locations specified by the metadata). When the corresponding slave node acknowledges the update, it updates the contents of the master copy and responds to the client.

Each storage node 20 incorporates a healing manager 60. The role of the healing manager 60 is to conduct the replica healing procedure once it is triggered by the cluster manager 55.

Figure 6:
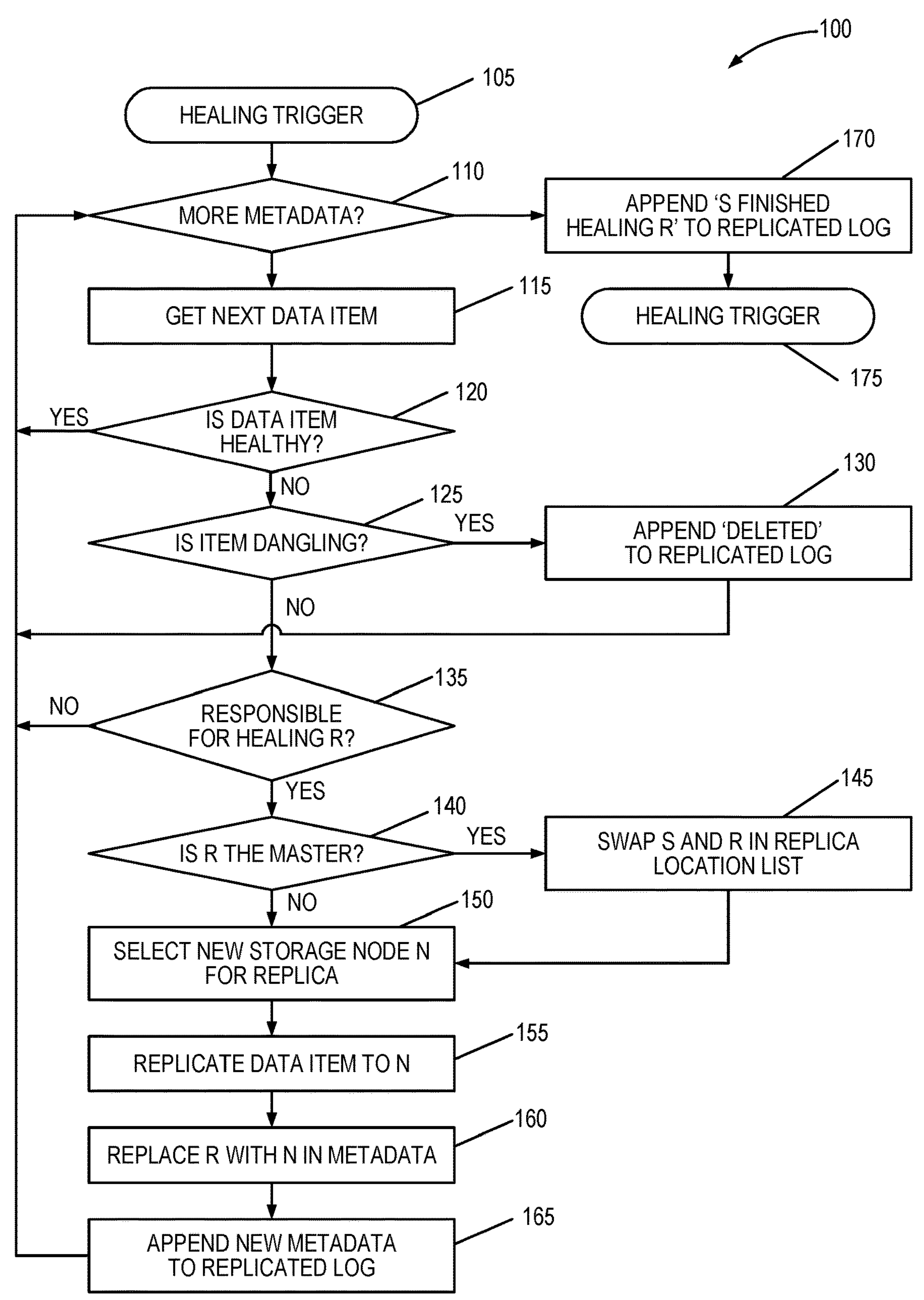
FIG. 6 a method of healing procedure implemented by a data storage node in a distributed database.

FIG. 6 illustrates an exemplary healing procedure 100 implemented by the healing manager 60. The healing procedure 100 begins responsive to a trigger from the cluster manager 45 (block 105). There are several conditions in which the cluster manager 45 will trigger a replica healing procedure. After the trigger, the storage nodes 20 can immediately proceed with the healing, without waiting for any form of coordination with any other storage nodes 20. The healing procedure is preformed locally and independently on each storage node 20.

A storage node S starts to heal R (the removed node) by iteratively scanning through its own locally stored metadata list. S continues to scan the metadata so long as there is more metadata to scan (block 110). If there are more data items to process, S retrieves the next data item and checks the associated replication location list to determine the state of health of the data item (blocks 115, 120). An item is deemed unhealthy state, i.e., one of its replicas was stored on R. If the data item is unhealthy, S checks whether the data item is dangling (block 125). Certain data items may have only a single (master) replica. If such a data item is stored on R, that item is lost after removal of R. During the healing procedure, the healing manager 60 appends a "DELETED" message to the replicated log for each dangling data item D (block 130). Once a storage node 20 receives such a notification (via the consensus service), it deletes the corresponding entry from its metadata list.

If a data item is compromised (i.e., one replica is stored on R), S checks whether it is responsible for healing the data item (block 135). S is determined to be responsible for healing the data item if it is the master for the data item or, if R is the master, it is the first listed slave in the replica location list. More generally, S is determined to be responsible for healing a data item if it is the first listed storage node 20 in the replica location list that is not compromised, e.g., the first ACTIVE storage node in the replica location list. If S is determined to be responsible for healing the data item, S checks whether R is the master for the data item and the process branches depending on the determination (block 140).

If R is not the master for the data item, S selects a new storage node N, that is not listed in the item's replica location list and replicates the contents of the data item to N (blocks 150, 155). S then replaces R with N in the metadata and appends new metadata to the replicated log (blocks 160, 165). If R is the master for the data item, self-promotes itself to be the new master by S swapping R and S in the replica location list for the data item (block 145). S then selects a new storage node N, that is not listed in the item's replica location list and replicates the contents of the data item to N (blocks 150, 155). S then replaces R with N in the metadata and appends new metadata to the replicated log (blocks 160, 165).

The healing process continues as long as there are additional entries in the metadata to be processed (block 110). Once all data items represented in the metadata are processed, S calls into the consensus service and appends an 'S FINISHED HEALING R' to the replicated log to inform the metadata manager 55 in other storage nodes 20 in the cluster 15 about the metadata update (block 170). After sending the notification, the procedure ends (block 175).

Each storage node 20 in the cluster 15 collects these FINISHED messages. Once all storage nodes 20 have reported to be done with healing R, the cluster manager 45 at each storage node 20 removes R from its peer list. At this point, the distributed healing procedure is finalized.

Figure 7:
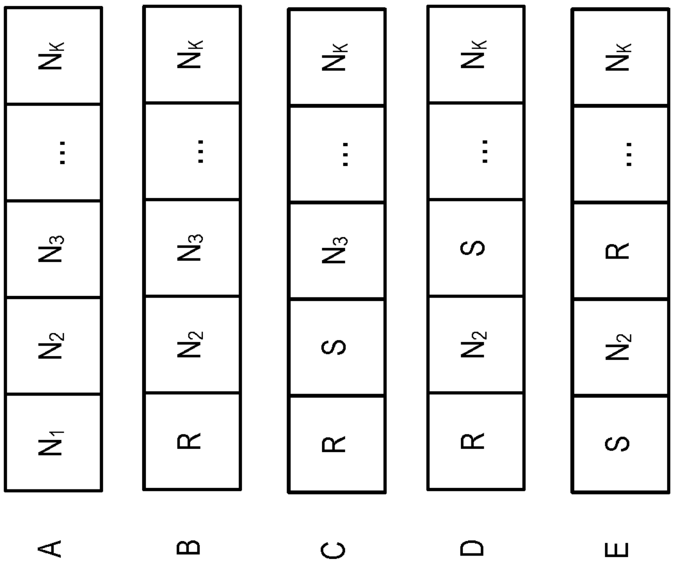
FIG. 7 illustrates various scenarios encountered during replica healing.

FIG. 7 illustrates five exemplary replica location lists representing the five possible scenarios that can be encountered when iterating the metadata. In all scenarios, replicas of the data item are stored in nodes N1-Nk. In scenario a, R is not listed in the replica location list so it is determined at block 120 in FIG. 6 that the data item is healthy. In scenarios b-e, the removed node R is listed among the replica locations. In these scenarios, it is determined at block 120 in FIG. 6 that the data item is unhealthy and requires healing. In scenario b, R is the master node for the data item but node S is not listed as one of the replica locations so node S is not responsible for healing R. In scenario c, node R is the master node for the data item and node S is first listed slave. In this scenario, node S is determined to be responsible for healing R. In scenario d, node R is the master node for the data item. Node S is included in the replica location list but is not the first listed slave. In this scenario, node N2 is determined to be responsible for healing R. Finally, in scenarios e, node S is the master node and R is a slave node for the data item. In this scenario, node S is determined to be responsible for healing R.

In some instances, S may not be able to select a new, independent storage node N. One such scenario is when there's not enough resource (e.g., free memory) on the independent storage nodes 20 to create the new replica. In one embodiment the system can rearrange the resources in the cluster 15 (e.g., by moving some data items to other storage nodes 20 to free up memory) to be able to proceed with healing. In other cases, such as. when there are no independent storage nodes 20 in the cluster 15, the healing of the data item may need to be deferred for a later point in time (e.g., until a new storage node 20 joins the cluster 15).

The various tasks carried out during healing can be prioritized in the system. First, healing can be performed as a background task, in order to minimize interference with other client-induced tasks. Second, the ordering in which the data items are scanned and healed can also be adjusted. For instance, the system can prioritize frequently or more recently used items to be scanned and healed first.

A benefit of the healing procedure is that data items remain available during the healing process. If one of the storage nodes 20 becomes unavailable, client are still able to access one of the remaining replicas stored in another storage node 20. In one embodiment, the system notifies the clients about disconnected storage nodes 20, so that clients know which storage nodes 20 are active/available. Clients should avoid issuing repeated requests to disconnected or inactive storage nodes 20, otherwise clients may get stuck. In another embodiment, the system allows clients to contact an unavailable node. The clients can wait for a conveniently set timeout to elapse and, after the timeout, retry the request on another replica.

When a client wishes to read a data item, it is aware of the item's replica locations. Hence, if the client is aware of the unavailability of a replica, it may read the data item through any of its other replicas.

When a client wishes to write a data item, it must send its write request to the master replica. If the master replica is healthy, then this procedure will work properly. However, when the master has failed, and is being healed, the client cannot simply write any of the slave replicas, as this could easily lead to an inconsistent state. To avoid rendering the data item unavailable, the client is informed about the failed master as previously described and sends a write request to the first slave node in the replica list, S (i.e., S is the second entry in the list). When S receives the write request, it already knows that the master copy of the to-be-written data item is being healed. Moreover, S is the one who is responsible for healing the data item. If the data item has already been healed by S by the time the write request reaches S, S is already the new master of the item and can handle the write request normally. If the data item is not yet healed by the time the write request reaches S, S temporarily buffers the request and performs an immediate healing of the data item. Once the healing of the data item is complete, S is the master and proceeds to handle the write request normally. In this case, the immediate healing will add one round-trip time overhead to the cost of a normal write operation. The overhead comes from the immediate re-replication of the data item to a newly created slave. We assume the overhead of appending the new metadata to the replicate log is deferred after replying to the client.

The healing procedure as herein described is robust and fault tolerant. Further, it can easily be extended to handle multiple node failures, even to cases where a second storage node 20 fails while the healing of a previously failed storage node 20 is in progress. In the case of multiple storage node failures, S is determined to be responsible for healing a data item if it is the first non-removed peer in the replica location list for a data item. In the data item healing procedure, S creates as many new independent replicas as the number of removed nodes in the replica location list for the data item. In the case of a dangling data item, the metadata managers 55 remove all items for which all replica nodes have been removed. For write availability handling, the client is configured to send write requests to the first non-removed peer in the replica location list.

Figure 8:
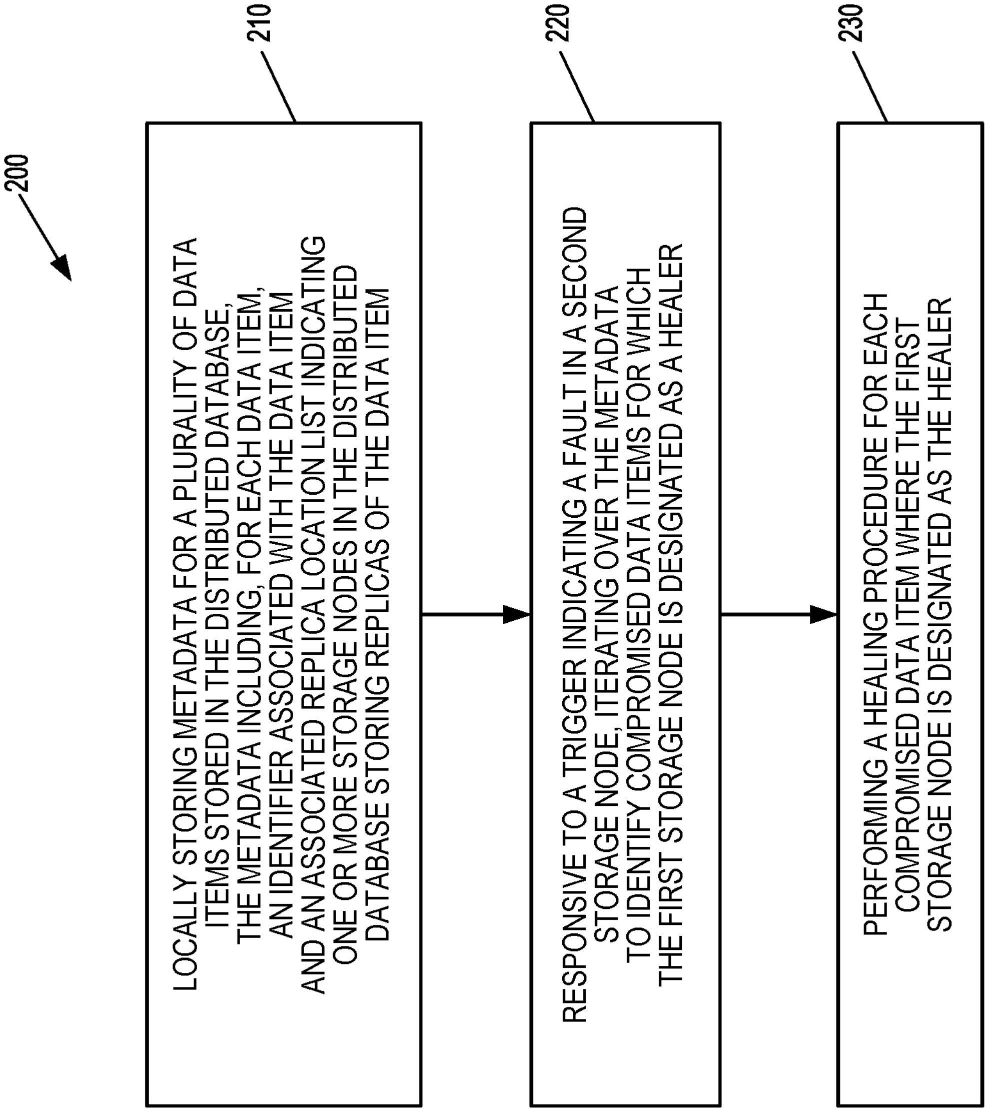
FIG. 8 illustrates a data storage node configured to implements a healing procedure as herein described.

FIG. 8 illustrates an exemplary method 200 implemented by a first storage node 20 in a distributed database of healing compromised data items stored in the distributed database. The storage node 20 locally stores metadata for a plurality of data items stored in the distributed database (block 210). The metadata includes, for each data item, an identifier associated with the data item and an associated replica location list indicating one or more storage nodes 20 in the distributed database storing replicas of the data item. Responsive to a trigger indicating a fault in a second storage node 20, the first storage node 20 iterates over the metadata to identify compromised data items for which the first storage node 20 is designated as a healing node (block 220). The storage node 20 then performs a healing procedure for each compromised data item where the first storage node 20 is designated as the healing node (block 230).

In some embodiments of the method 200, identifying compromised data items for which the first storage node 20 is designated as a healing node comprises identifying one or more compromised data items having replicas stored in the second storage node 20 and, for each compromised data item, determining whether the first storage node 20 is designated as the healing node based on an order of the storage nodes 20 in the associated replica location list. In one example, the first storage node is determined to be the designated healing node when the first storage node 20 is first among the uncompromised storage nodes 20 in the associated replica location list.

In some embodiments of the method 200, performing a healing procedure for each compromised data item where the first storage node 20 is designated as the healing node comprises replicating the compromised data item to a third storage node 20 selected by the first storage node 20, updating the associated replica location list to include the third storage node and propagating the update to the replica location list for the compromised data item to other storage nodes 20 in the distributed database.

Some embodiments of the method 200 further comprise determining, for each compromised data item, whether the first storage node 20 is a master storage node for the compromised data item. In one example, the first storage node 20 determines that it is the master node for a compromised data item when the first storage node 20 is first in the associated replica location list.

Some embodiments of the method 200 further comprise, when the first storage node 20 is not the master storage node 20 for the data item self-promoting the first storage node 20 to a status of new master node for the compromised data item, updating the associated replica location list to indicate the updated status of the first storage node 20 and propagating the update to the replica location list to other storage nodes 20 in the distributed database.

Some embodiments of the method 200 further comprise synchronizing the locally stored metadata with replicated metadata locally stored by other storage nodes 20.

Some embodiments of the method 200 further comprise receiving a location request from a client device for a data item and, responsive to the location request, sending the replica location associated with the data item to the client device.

Some embodiments of the method 200 further comprise receiving a write request from a client device for a new data item, replicating, responsive to the write request, the new data item to one or more storage nodes 20 in the distributed database, updating the locally stored metadata to include an identifier for the new data item and an associated replica location list and propagating the update to the locally stored metadata to other storage nodes 20 in the distributed database.

Some embodiments of the method 200 further comprise receiving a read request from a client device for a compromised data item and providing, responsive to the read request, the client device a copy of the compromised data item before the data item is healed.

Figure 9:
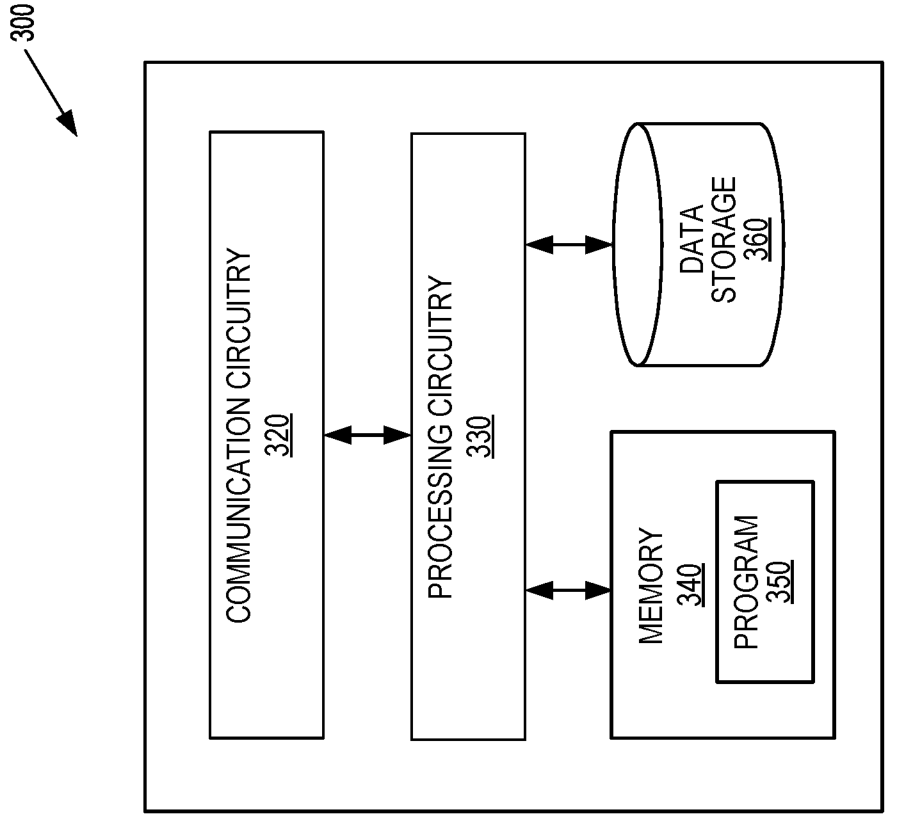
FIG. 9 illustrates a method implemented by a data storage node in a distributed database of healing a compromised data item.

FIG. 9 illustrates the main functional components of a storage node 300 in a distributed database system. The storage node 300 includes communication circuitry 320, processing circuitry 330, memory 340 and internal or external data storage 360.

The communication circuitry 320 comprises a network interface for communicating with other storage nodes 20 and a client interface for communicating with client devices over a communication network, such as an Internet Protocol (IP) network. The interfaces can be wired or wireless interfaces.

Processing circuitry 330 controls the overall operation of the storage node 300 and is configured to implement the methods shown and described herein. The processing circuitry 430 may comprise one or more microprocessors, hardware, firmware, or a combination thereof configured to perform methods 100 and 200 shown in FIGS. 6 and 8 respectively. In one embodiment, the processing circuitry 330 is configured to locally store metadata for a plurality of data items stored in the distributed database. The metadata includes, for each data item, an identifier associated with the data item and an associated replica location list indicating one or more storage nodes 20 in the distributed database storing replicas of the data item. The processing circuitry 330 is further configured to iterate, responsive to a trigger indicating a fault in a second storage node 20, over the metadata to identify compromised data items for which the first storage node 300 is designated as a healing node and perform a healing procedure for each compromised data item where the first storage node 300 is designated as the healing node.

Memory 340 comprises both volatile and non-volatile memory for storing computer program 350 and data needed by the processing circuitry 330 for operation. Memory 340 may comprise any tangible, non-transitory computer-readable storage medium for storing data including electronic, magnetic, optical, electromagnetic, or semiconductor data storage. Memory 340 stores a computer program 350 comprising executable instructions that configure the processing circuitry 330 to implement the methods 100 and 200 shown in FIGS. 6 and 8 respectively. A computer program 350 in this regard may comprise one or more code modules corresponding to the means or units described above. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 450 for configuring the processing circuitry 330 as herein described may be stored in a removable memory, such as a portable compact disc, portable digital video disc, or other removable media. The computer program 350 may also be embodied in a carrier such as an electronic signal, optical signal, radio signal, or computer readable storage medium.

Data storage 360 comprises volatile or non-volatile memory for storing data items as herein described. The data storage can be internal to the storage node 300 or external to the storage node 300. In one embodiment, the data storage comprises volatile memory, such as Dynamic Random-Access Memory (DRAM). In other embodiments, the data storage manager 360 comprises persistent media, such as a Solid State Drive (SSD). The choice between the two mainly depends on the access latency and data durability requirements of the application.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

The healing procedure as herein described enables full availability of data items during recovery for both reading and writing. The granular replica model easily scales to a large number of data items to be healed. Single points of failure in the healing procedure are also eliminated. Parallelism avoids overloading a single healing controller/coordinator and fits small- and mid-scale systems, which are typical for telecom applications. The solution avoids unnecessary data copying during healing and is suitable for ephemeral use-cases where persistent storage is not necessary (e.g., telecom session states).

What is claimed is:

1. A method implemented by a first storage node in a distributed database of healing compromised data items stored in the distributed database, the method comprising:

locally storing, in a data storage, metadata for a plurality of data items stored in the distributed database, the metadata including, for each data item, an identifier associated with the data item and an associated replica location list indicating one or more storage nodes in the distributed database storing replicas of the data item;

responsive to a trigger indicating a fault in a second storage node, iterating over the metadata in the data storage to autonomously identify, based on the replica location list for each data item, compromised data items for which the first storage node is designated as a healing node; and performing a healing procedure for each compromised data item where the first storage node is designated as the healing node.

2. The method of claim 1, wherein identifying compromised data items for which the first storage node is designated as a healing node comprises:

identifying one or more compromised data items having replicas stored in the second storage node; and for each compromised data item, determining whether the first storage node is designated as the healing node based on an order of the storage nodes in the associated replica location list.

3. The method of claim 2, wherein the first storage node is determined to be the designated healing node when the first storage node is first among the uncompromised storage nodes in the associated replica location list.

4. The method of claim 1, wherein performing a healing procedure for each compromised data item where the first storage node is designated as the healing node comprises:

replicating the compromised data item to a third storage node selected by the first storage node;

updating the associated replica location list to include the third storage node; and propagating the update to the replica location list for the compromised data item to other storage nodes in the distributed database.

5. The method of claim 1, further comprising determining, for each compromised data item, whether the first storage node is a master storage node for the compromised data item.

6. The method of claim 5, wherein the first storage node determines that it is the master node for a compromised data item when the first storage node is first in the associated replica location list.

7. The method of claim 5, further comprising, when the first storage node is not the master storage node for the data item:

self-promoting the first storage node to a status of new master node for the compromised data item;

updating the associated replica location list to indicate the updated status of the first storage node; and propagating the update to the replica location list to other storage nodes in the distributed database.

8. The method of claim 1, further compromising synchronizing the locally stored metadata with replicated metadata locally stored by other storage nodes.

9. The method of claim 1, further comprising:

receiving a location request from a client device for a data item; and responsive to the location request, sending the replica location associated with the data item to the client device.

10. The method of claim 1, further comprising:

receiving a write request from a client device for a new data item;

replicating, responsive to the write request, the new data item to one or more storage nodes in the distributed database;

updating the locally stored metadata to include an identifier for the new data item and an associated replica location list; and propagating the update to the locally stored metadata to other storage nodes in the distributed database.

11. The method of claim 1, further comprising:

receiving a read request from a client device for a compromised data item; and responsive to the read request, providing the client device a copy of the compromised data item before the data item is healed.

12. A storage node in a distributed database configured to heal compromised data items stored in the distributed database, the storage node comprising:

a metadata manager configured to locally store metadata in a local data storage for a plurality of data items stored in the distributed database, the metadata including, for each data item, an identifier associated with the data item and an associated replica location list indicating one or more storage nodes in the distributed database storing replicas of the data item; and a healing manager configured to:

iterate, responsive to a trigger indicating a fault in a second storage node, over the metadata in the local data storage to autonomously identify, based on the replica location list for each data item, compromised data items for which the first storage node is designated as a healing node; and perform a healing procedure for each compromised data item where the first storage node is designated as the healing node.

13. The storage node of claim 12, wherein the healing manager identifies compromised data items for which the first storage node is designated as a healing node by:

identifying one or more compromised data items having replicas stored in the second storage node; and for each compromised data item, determining whether the first storage node is designated as the healing node based on an order of the storage nodes in the associated replica location list.

14. The storage node of claim 13, wherein the healing manager determines that the first storage node is the designated healing node when the first storage node is first among the uncompromised storage nodes in the associated replica location list.

15. The storage node of claim 12, wherein the healing manager performs a healing procedure for each compromised data item where the first storage node is designated as the healing node by:

replicating the compromised data item to a third storage node selected by the first storage node;

updating the associated replica location list to include the third storage node; and propagating the update to the replica location list for the compromised data item to other storage nodes in the distributed database.

16. The storage node of any one of claim 15, wherein the healing manager further determines, for each compromised data item, whether the first storage node is a master storage node for the compromised data item.

17. The storage node of claim 16, wherein the healing manager determines that the first storage node is the master node for a compromised data item when the first storage node is first in the associated replica location list.

18. The storage node of claim 16, wherein the healing manager is further configured to, when the first storage node is not the master storage node for the data item:

self-promote the first storage node to a status of new master node for the compromised data item;

update the associated replica location list to indicate the updated status of the first storage node; and propagate the update to the replica location list to other storage nodes in the distributed database.

19. The storage node of claim 12, wherein the metadata manager is further configured to synchronize the locally stored metadata with replicated metadata locally stored by other storage nodes.

20. The storage node of claim 12, further comprising a storage manager configured to:

receive a location request from a client device for a data item; and responsive to the location request, send the replica location associated with the data item to the client device.

21. The storage node of claim 12, further comprising a storage manager configured to:

receive a write request from a client device for a new data item;

replicate, responsive to the write request, the new data item to one or more storage nodes in the distributed database;

update the locally stored metadata to include an identifier for the new data item and an associated replica location list;

propagate the update to the locally stored metadata to other storage nodes in the distributed database.

22. The storage node of claim 12, further comprising a storage manager configured to:

receive a read request from a client device for a compromised data item; and responsive to the read request, provide the client device a copy of the compromised data item before the data item is healed.

23. A storage node in a distributed database configured to heal compromised data items stored in the distributed database, the storage node comprising:

communication circuitry configured for communication with client devices and with other storage nodes in the distributed database;

data storage for storing replicas of data items;

processing circuitry configured to:

locally store, in the data storage, metadata for a plurality of data items stored in the distributed database, the metadata including, for each data item, an identifier associated with the data item and an associated replica location list indicating one or more storage nodes in the distributed database storing replicas of the data item iterate, responsive to a trigger indicating a fault in a second storage node, over the metadata in the data storage to autonomously identify, based on the replica location list for each data item, compromised data items for which the first storage node is designated as a healing node; and perform a healing procedure for each compromised data item where the first storage node is designated as the healing node.

* * * * *